(12) United States Patent
Pellenc

(10) Patent No.: US 7,870,712 B2
(45) Date of Patent: Jan. 18, 2011

(54) METHOD AND MACHINE FOR VINE AUTOMATIC PRUNING

(75) Inventor: Roger Pellenc, Pertuis (FR)

(73) Assignee: Pellenc (Societe Anonyme), Pertuis (FR)

( * ) Notice: Subject to any disclaimer, the term of this patent is extended or adjusted under 35 U.S.C. 154(b) by 0 days.

(21) Appl. No.: 12/247,070

(22) Filed: Oct. 7, 2008

(65) Prior Publication Data
US 2009/0090093 A1 Apr. 9, 2009

(30) Foreign Application Priority Data
Oct. 9, 2007 (FR) .................... 07 07083

(51) Int. Cl.
*A01G 3/04* (2006.01)
(52) U.S. Cl. .................... 56/234; 56/328.1; 56/233
(58) Field of Classification Search ............... 56/328.1, 56/233, 234, 236, 330; 47/1.01 R, 4; 356/432
See application file for complete search history.

(56) References Cited

U.S. PATENT DOCUMENTS 4,543,775 A * 10/1985 Horn et al. .................... 56/235
5,544,444 A * 8/1996 Oldridge .................... 47/4
6,634,162 B1 * 10/2003 Andros ............... 56/328.1
2005/0039431 A1 * 2/2005 Schloesser et al. ....... 56/340.1
2006/0162309 A1 7/2006 Schloesser
2006/0272201 A1 * 12/2006 Pellenc ............... 47/1.01 R

FOREIGN PATENT DOCUMENTS

| EP | 0312126 | 4/1989 |
|---|---|---|
| EP | 0898877 | 3/1999 |
| EP | 974262 A1 * | 1/2000 |
| FR | 2852785 | 10/2004 |
| FR | 2878124 | 5/2006 |

* cited by examiner

*Primary Examiner*—Árpád Fábián-Kovács
(74) *Attorney, Agent, or Firm*—Egbert Law Offices PLLC

(57) ABSTRACT

An apparatus for automatically pruning vines grown in a row in a cordon-leading manner has a chassis, a pre-pruning module, a clear-cutting module and a position sensor. The clear-cutting module is positioned behind the pre-pruning module and has cutters thereon. The position sensor is forward of the clear-cutting module so as to locate the cordon and to position the cutter so as to achieve a clear cut from a periphery of the cordon. The clear-cutting module has upper cutters, lower cutters and lateral cutters.

35 Claims, 16 Drawing Sheets

METHOD AND MACHINE FOR VINE AUTOMATIC PRUNING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention concerns a method and a machine for automatic pruning of a vine grown according to the cordon leading method or so-called "Royat cordon" under which at least one fruit-bearing shoot or cordon is attached around a horizontal carrier wire, generally through spiral winding of said cordon.

2. Description of Related Art Including Information Disclosed Under 37 CFR 1.97 and 37 CFR 1.98

In the field of viticulture, there exists stiff competition between producers worldwide. Prices are one of the determining criteria to remain competitive. These prices result, for a large part, from growing methods implemented at the vineyards. Mechanization of the vine-growing operations, such as for example, pre-pruning, topping, harvesting, and processing of the crop made it possible to reduce the labor items and thus to reduce the production costs. However, pruning is the most costly labor item as it always requires a manual reworking phase after the mechanical pre-pruning of the vine. Vine mechanical pre-pruning indeed makes it possible to cut off and clear the maximum of stocks or shoots whose tendrils are attached to the railing wires at a close distance of the cordon. However, pre-pruning does not make it possible to control with precision the length of the stocks that must remain attached to the cordon, and therefore neither the number of fruit-bearing eyes or buds on those stocks. Therefore, manual reworking has to be done after the pre-pruning to adjust the length of the stocks to the number of eyes to be kept. In addition, the purpose of such manual reworking is to remove the disregarded stocks, in particular laterally and below the cordon, as well as the new growths on the trunk. Furthermore, the purpose of manual pruning is to ensure the precision of the pruning, which enables the grape growers to establish the desired production yield so as to maintain the quality of the quantity of wine produced. A major disadvantage of manual pruning is the time required to carry it out, which represents a major percentage of the production cost.

In order to improve the results of the pre-pruning operation, the applicant invented a method and device to analyze the structure of crop-bearing hedges (WO2004/089063) that, associated to a pre-pruning machine, for example, of the type described in European Patent No. 0312126, permits to maintain the cutters of the pre-pruning machine above and at a sufficient distance of the cordon, so as to prevent any potential damage to the latter and to avoid the removal of fruit-bearing eyes that it is desirable to keep, while keeping the pruned stocks or shoots the shortest possible.

Indeed, if it is possible to adjust the height of the machine cutters at the start of a row, their position in relation to the cordon may be modified during their movement along that row because of soil unevenness so that in case of sudden drop resulting of the machine going over a dip of the ground, the cordon can be damaged or stripped of its fruit-bearing eyes.

The pre-pruning machines equipped with a fruit-bearing hedge structure analysis device, as described in WO2004/089063 document do not allow for:
a sufficiently precise cut to forgo a later pruning operation or to significantly limit the manual reworking time; or
pruning of stocks growing laterally or below the cordon.

BRIEF SUMMARY OF THE INVENTION

The purpose of this invention includes allowing for:
a sufficiently precise cut of the stocks above the cordon so as to, if not eliminate completely the manual reworking operation, at least significantly limit the reworking time, and even perform only one manual pruning every two or three years while meeting the pruning requirements; and
complete pruning around the cordon.

Under the invention, this goal is achieved using:
a method under which the following operations are carried out:
pre-pruning of at least all of the stocks extending above the cordons using a first cutting module designed to remove from the railing the cut-off stocks resulting from said pre-pruning;
localization in space of the cordons using at least one position reconnaissance system and use of the information collected by said system to control the positioning of the cutters of a second cutting module working after said first pre-pruning module to achieve a clear-cutting of the remaining pruning left from the periphery of the cordon at a predetermined short distance in relation to said cordon; and
a machine mainly remarkable in that it comprises two modules installed on one common chassis and arranged one after the other considering the travel direction of said machine, when working. On one hand, there is a first pre-pruning module, for example of the type comprising two cutters, each consisting of multiple rotary cutters or rotary components participating in the cutting action, superimposed and carried by a common shaft. On the other hand, there is a second clear-cutting module, comprising cutters and at least one position reconnaissance system designed or configured to allow for the localization in space of the cordons and to control the positioning of the cutters of this second module to achieve a clear cut of the remaining prunings from the periphery of the cordon, at a predetermined short distance in relation to said cordon.

According to a highly advantageous implementation of the method, the electronic system controls the positioning of the cutters of the second module based on the travel speed of the machine and of predetermination by the operator of the cutting distance in relation to the cordon.

According to a preferred implementation of the method applicable to a machine whose lateral cutters of the second module are guided in their movement on both sides of the cordons by rotary combs, the latter being driven in rotation at a speed close to the travel speed of the machine when working.

According to a characteristic arrangement of the invention, the clear-cutting module comprises at least two cutters designed to move below the cordons, these upper cutters being arranged horizontally or in a reverse V configuration.

According to an another characteristic arrangement of the invention, the clear-cutting module comprises at least two cutters designed to move below the cordons, these lower cutters being arranged horizontally or in a V configuration.

According to another characteristic arrangement of the invention, the clear-cutting module comprises means to ensure automatic separation and automatic return to an active close position of the upper cutters when going over the railing posts and if necessary, when going over the stocks.

According to another characteristic arrangement of the invention, the clear-cutting module comprises means ensuring automatic separation and automatic return to an active close position of the lower cutters when running past the railing posts and if necessary, when running past the stocks.

According to another characteristic arrangement of the invention, the clear-cutting module comprises at least two lateral cutters designed to move on both side of the cordons.

According to another characteristic arrangement of the invention, the cutters of the clear-cutting module comprise circular cutting tools, for example saws.

According to another characteristic arrangement of the invention, the means ensuring the automatic separation of the upper and/or lower cutters consist of idler or motorized wheels, said wheels having a radius slightly greater than the radius of action of the cutters.

According to another characteristic arrangement of the invention, the clear-cutting module comprises a raise/lower system enabling the upper cutters to make a cut above the cordons and to follow said cordons upward with a few millimeter precision.

According to another characteristic embodiment of the invention, the clear-cutting module comprises a second raise/lower system enabling the lower cutters to make below the cordons a cut of the stocks at a distance of the cordons with a few millimeter precision.

According to another characteristic embodiment of the invention, the clear-cutting module comprises a raise/lower system enabling the upper, lateral and lower cutters to move so as to follow the cordons with a few millimeter precision.

According to another characteristic embodiment of the invention, rotary combs are placed in front of the inside face of the lateral cutters, said combs comprising curved fingers arranged around the cutting edge of said cutters. The lateral cutters of the clear-cutting module comprise means for rotational driving of the combs.

According to another characteristic embodiment of the invention, the upper and/or lower, and/or lateral cutters of the cleat-cutting module are mounted with an independent lateral movement capability.

According to another characteristic embodiment of the invention, the circular cutting tools of the cutters are driven independently by motors, for example, by electric or hydraulic motors.

According to another characteristic embodiment of the invention, the artificial vision system equipping the clear-cutting module is designed to control the raise/lower systems of the upper cutters, lower cutters and lateral cutters.

According to another characteristic embodiment of the invention, the raise/lower systems of the cutters n the clear-cutting module comprise electric or hydraulic actuators.

According to another characteristic embodiment of the invention, the actuators of the cutters are equipped with position sensors that participate in the controls of said actuators.

According to another characteristic embodiment of the invention, the machine is equipped with shoes permitting the centering of said machine in relation to the vine stocks and posts. These shoes are located below the cutters of the pre-pruning and pruning modules.

BRIEF DESCRIPTION OF THE SEVERAL VIEWS OF THE DRAWINGS

The above purposes, characteristics and advantages and many more will become clearer from the description below and the attached drawings where.

DETAILED DESCRIPTION OF THE INVENTION

Reference is made to said drawings to describe interesting, although not limiting, examples of implementation of the method and embodiment of the integral pruning machine under the invention.

It is reminded that in the field and language of viticulture, especially in the application of vine grown according to the cordon method, so-called "Royat Cordon":

the term "pre-pruning" as used in this presentation and in the claims means the operation consisting of cutting the shoots or branches at a distance of approx. 10 to 15 cm from the horizontal cordon from which they come; this operation is generally carried out during the winter season using pre-pruning machines or pre-pruners (for example of the type described in EP 0 312 126 document) designed to remove simultaneously the cut stocks resulting from that operation; and while the term "pruning" also used in the description and drawings means the operation consisting of cutting back the portions of shoots that remained attached to the cordon to a closer distance to said cordon (for example at a distance of approx. 2 to 3 cm); this second cutting operation is thus carried out after the pre-pruning so as to leave on the cordon only the number of buds or eyes determined by the grape grower based on the expected yield.

Although in both cases the object is to cut shoots or branches, these are in fact two different activities as the first one can be done mechanically using machines while the second one is always done manually because of its delicate nature requiring precision.

the term "cordon" means a shoot or the curved upper part of the trunk of a vine stock that was attached to a roughly horizontal carrier wire and grew along the latter, usually by spirally winding around said carrier wire and from which fruit-bearing shoots grow.

Figure 1:
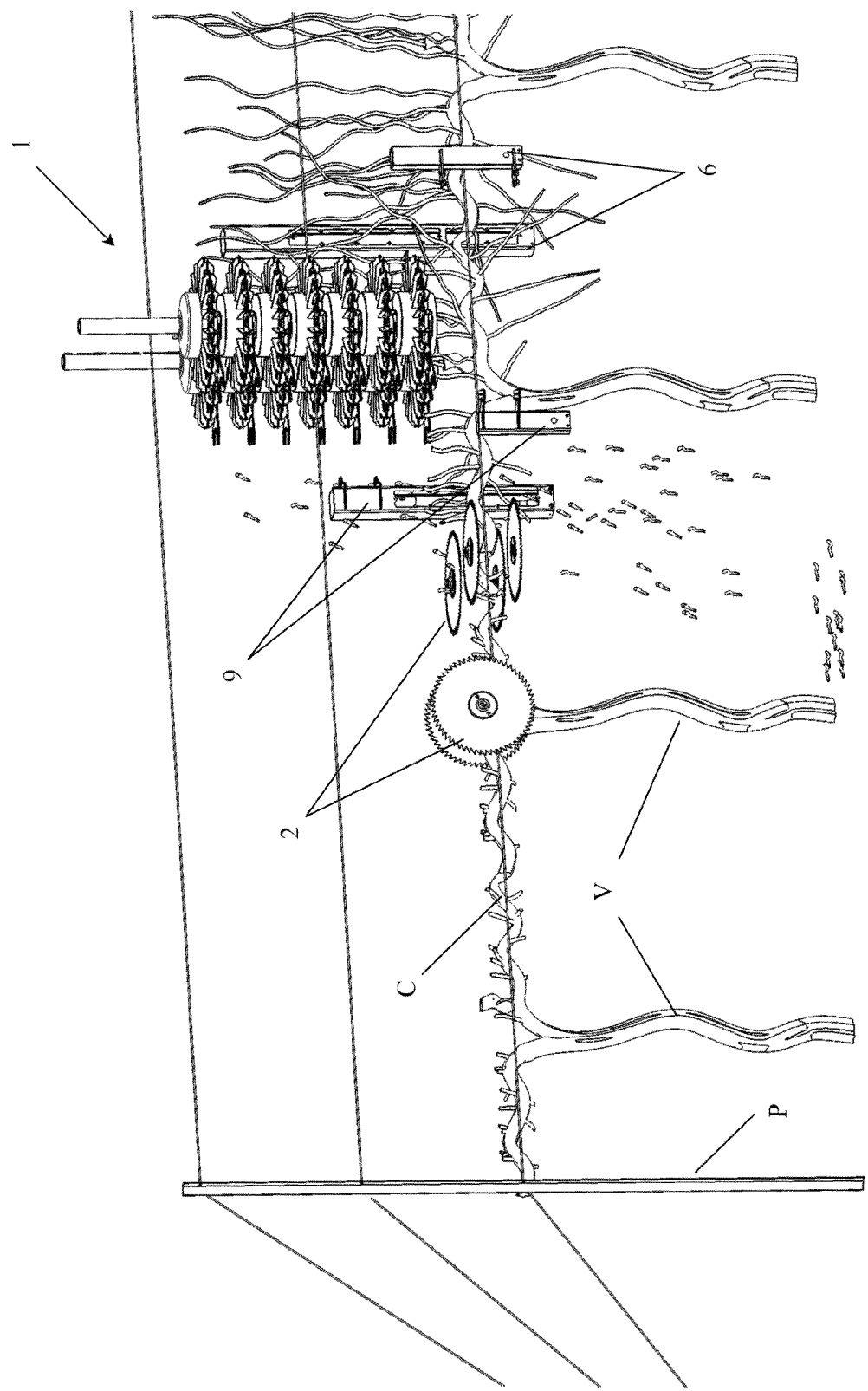
FIG. 1 is a schematic view showing the method and machine under the invention.

The automatic pruning machine includes two modules positioned on a common chassis 19, a first module, the pre-pruning module 1 and a second module, the clear-cutting module 2, mounted one after the other in the travel direction of the machine, as schematically shown in FIG. 1.

Figure 2:
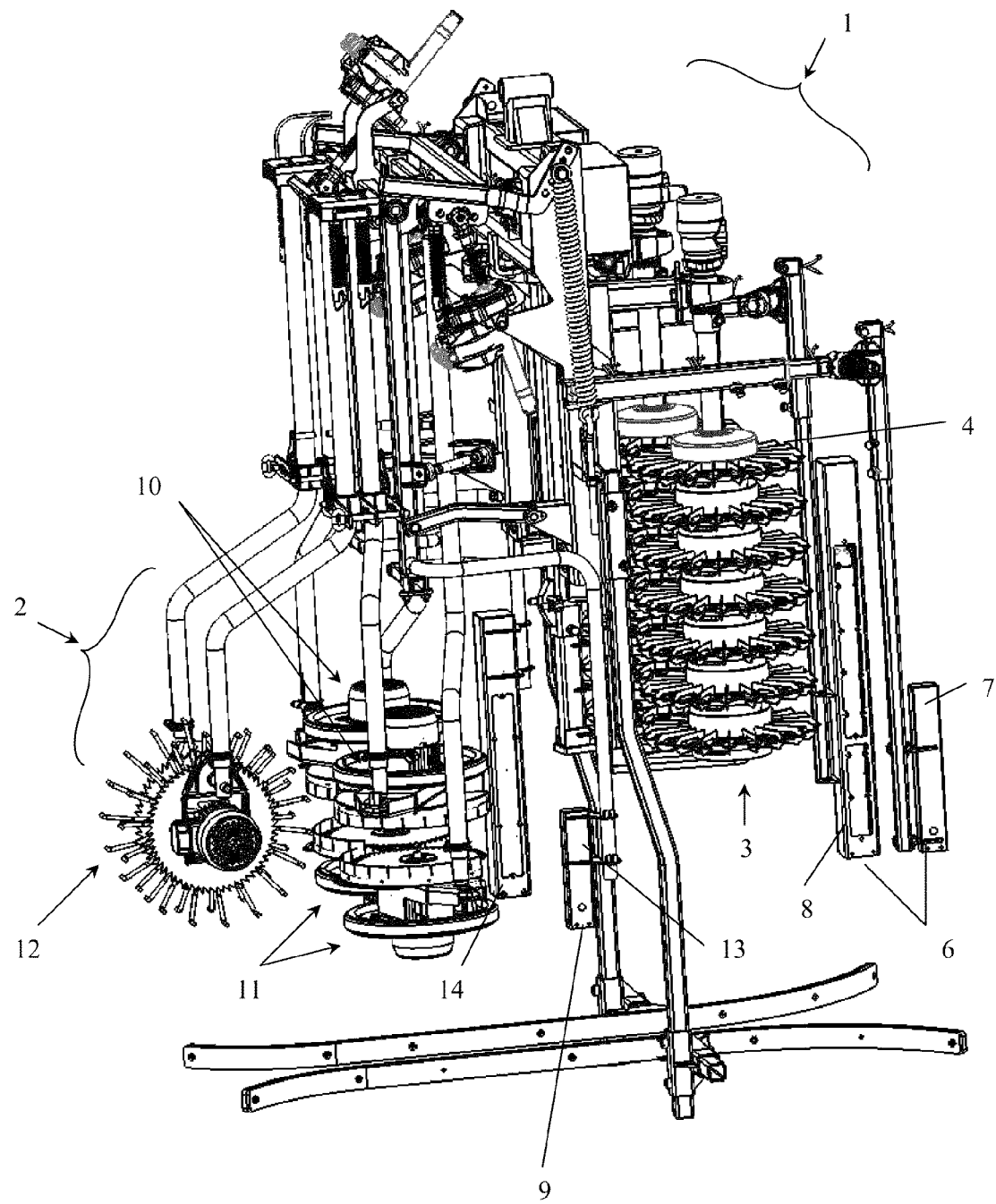
FIG. 2 is a perspective view of an advantageous embodiment of the vine integral automatic pruning machine under the invention.

The pre-pruning module 1 (FIG. 2) comprises mainly:

a cutting head comprising two cutting assemblies 3, each consisting of multiple rotary cutters 4, superimposed and carried by a common shaft 5, said cutting assemblies being mounted with a moving capability making it possible to bring them close to one another, so as to occupy a close working position, i.e., a cutting position, or to pull them apart from one another so as to automatically retract when going over railing posts, and to automatically return them into the direction of the working line of said module after having rounded said posts; such a cutting head being, for example, of the type described in EP 0 312 126 document; and an artificial vision system 6, for example, of the type described in the WO2004/089063 document, operating in direct transmission and comprising, on one hand, at least one transmitter unit 7 that includes at least one, and preferably, multiple light ray emitters, and, on the other hand, at least one receiver unit 8 that includes at least one and preferably multiple light ray receivers arranged vertically.

It is advantageously installed in front of the cutting assemblies of the pre-pruning module and it preferably consists of infrared transmitters and receivers and more specifically of near-infrared radiation. The transmitter unit and the receiver unit are arranged apart from each other so as to be able to be placed facing each other on either side of the vine row whenever the machine moves along said row.

The transmitter unit, comprising for example three transmitters is designed so that each transmitter emits modulated light at a given frequency. The receiver unit preferably comprises three vertical rows or columns of receivers, each column possibly containing a rather significant number of receivers.

Since the frequency of each transmitter is the tuning frequency of the associated receiving column, each receiving column detects only signals transmitted by the associated transmitter. Whenever a transmitter emits a modulated signal at a given time, each receiver on the receiving column corresponding to said transmitter provides either an inactive state corresponding to a non-blanked signal and therefore to the absence of any obstacle between the transmitter and receiver, or an active state corresponding to a blanked signal and therefore to the presence of an obstacle between the transmitter and receiver, such obstacle being one of the components of the vine row, namely a stock, post or cordon.

It also comprises a programmed or configured electronic system to process the information generated by light blankings to view the vine row structural components. This electronic system is described in greater detail below.

The clear-cutting module 2 (FIG. 2) comprises mainly in the machine travel direction:

an artificial vision system 9 located in front to the pruners; and upper cutters 10, lower cutters 11, and lateral cutters 12 located after the upper and lower cutters.

The artificial vision system of the clear-cutting system comprises, on one hand, at least one transmitter unit 13 that includes at least one, and preferably, multiple light ray emitters, and, on the other hand, at least one receiver unit 14 that includes at least one and preferably multiple light ray receivers arranged vertically. This system is similar by its constitution to the first artificial vision system but has a much finer definition than the latter.

The artificial vision system of the clear-cutting module operates in direct transmission in a manner similar to the first artificial vision system. The modulated signals emitted by a transmitter are detected only by the corresponding receivers based on a determined frequency. The position and shape of the cordon are detected when emitted signals are not caught by the corresponding receivers. This makes it possible to locate the position of the upper contour and of the lower contour of said cordon. In other words, the artificial vision system permits to detect the location in space of the cordon.

Figure 5A:
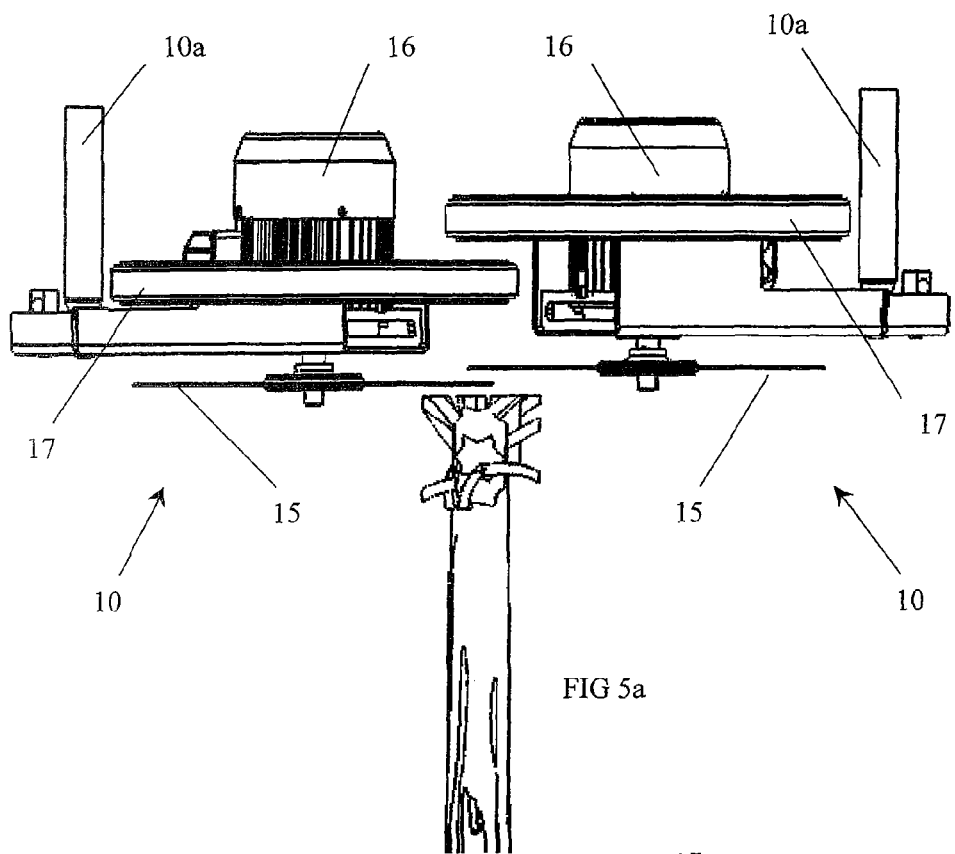
FIGS. 5a and 5b are front elevation views of the upper cutters shown in pruning situation above a cordon, such cutters being arranged horizontally in FIG. 5a and in reverse V position in FIG. 5b.
Figure 7:
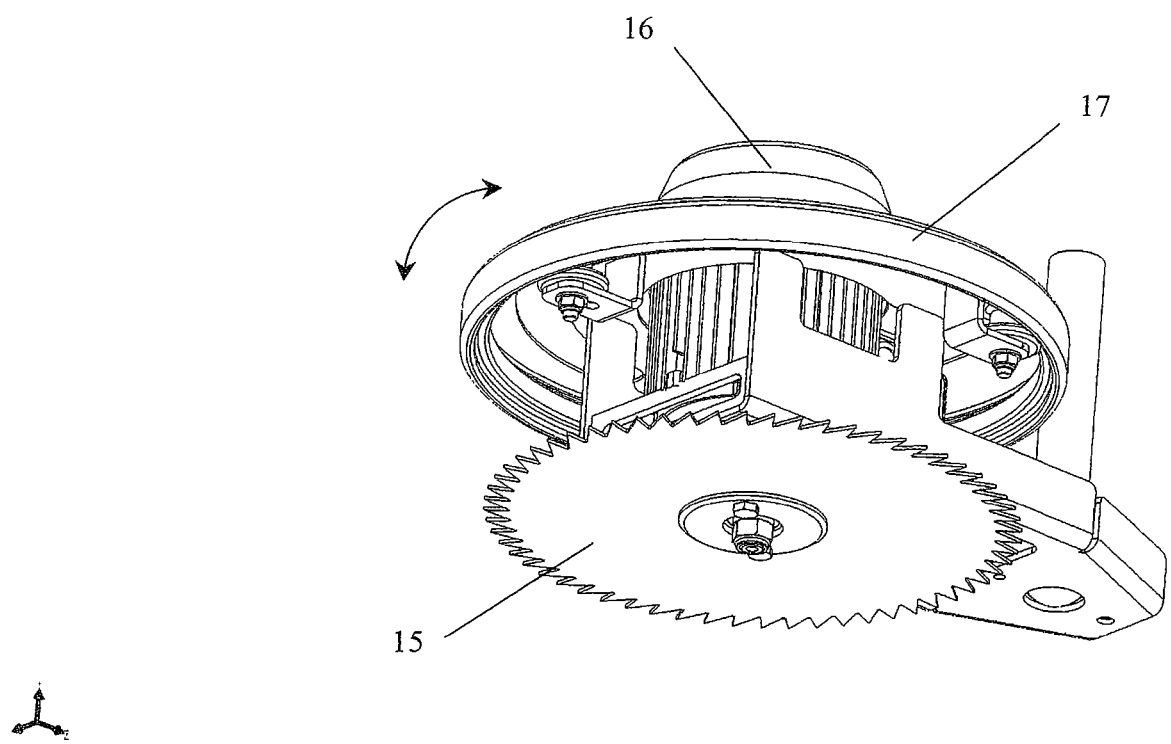
FIG. 7 is a perspective view of a pruner.
Figure 12:
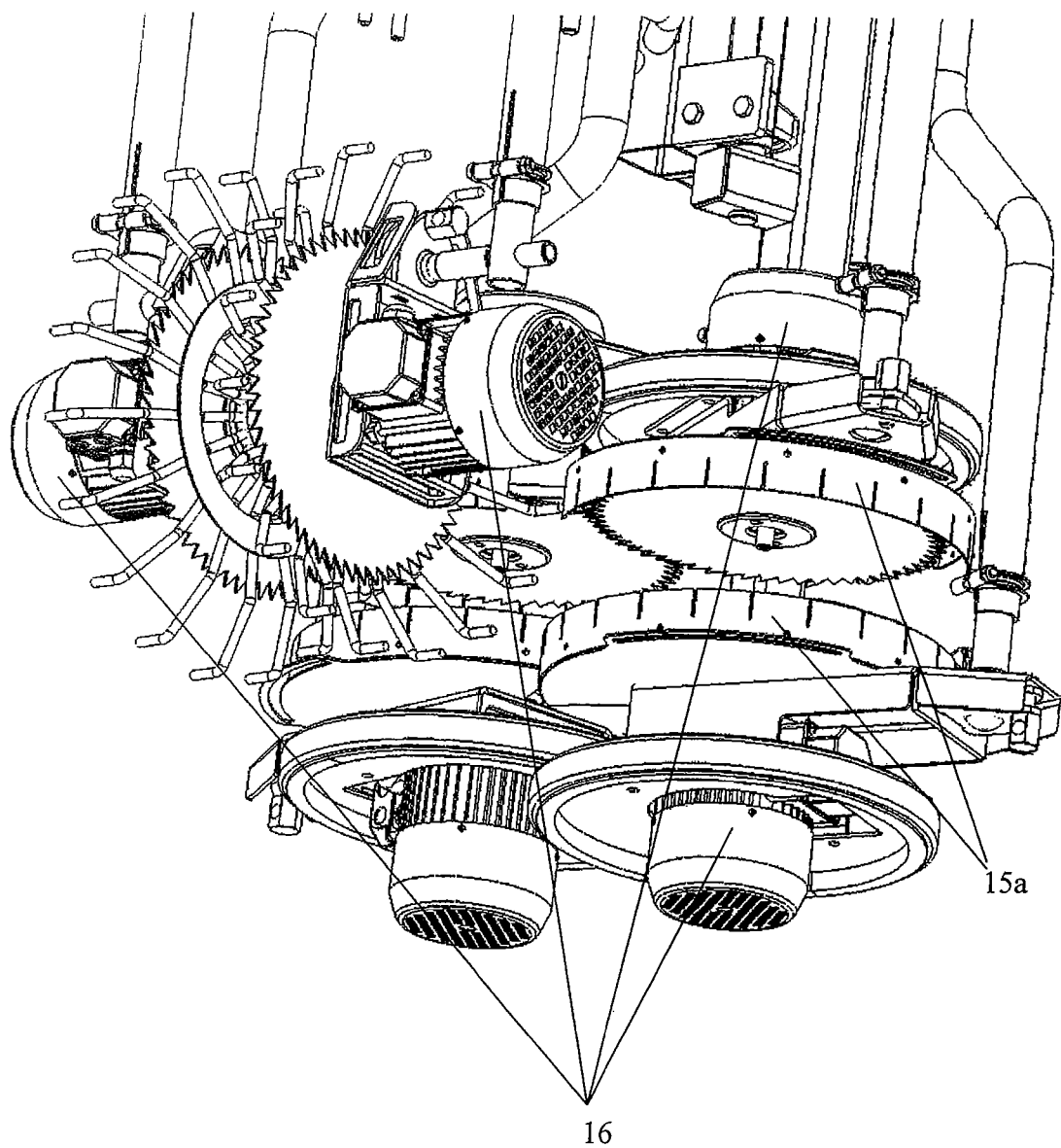
FIG. 12 is a detailed perspective view showing more specifically the driving means for the cutters.

Each upper cutter 10 (FIGS. 5a, 5b and 7) comprises:

a cutting tool 15, consisting for example of a circular saw;

an electric motor 16 for the rotational driving of such cutting tool 15;

an idler or motorized wheel 17, mounted coaxially to the tool and above it at a distance of a few centimeters, with a radius slightly greater than the radius of action of the cutting tool 15 and making it possible to go by the posts, said wheel 17 having a diameter slightly greater than that of the cutting tool 15 according to the example shown (FIG. 7); and a protecting device 15a for the cutting tool 15, such as, for example, a soft guard, mounted coaxially to the tool and above it (FIG. 12).

Figure 5B:
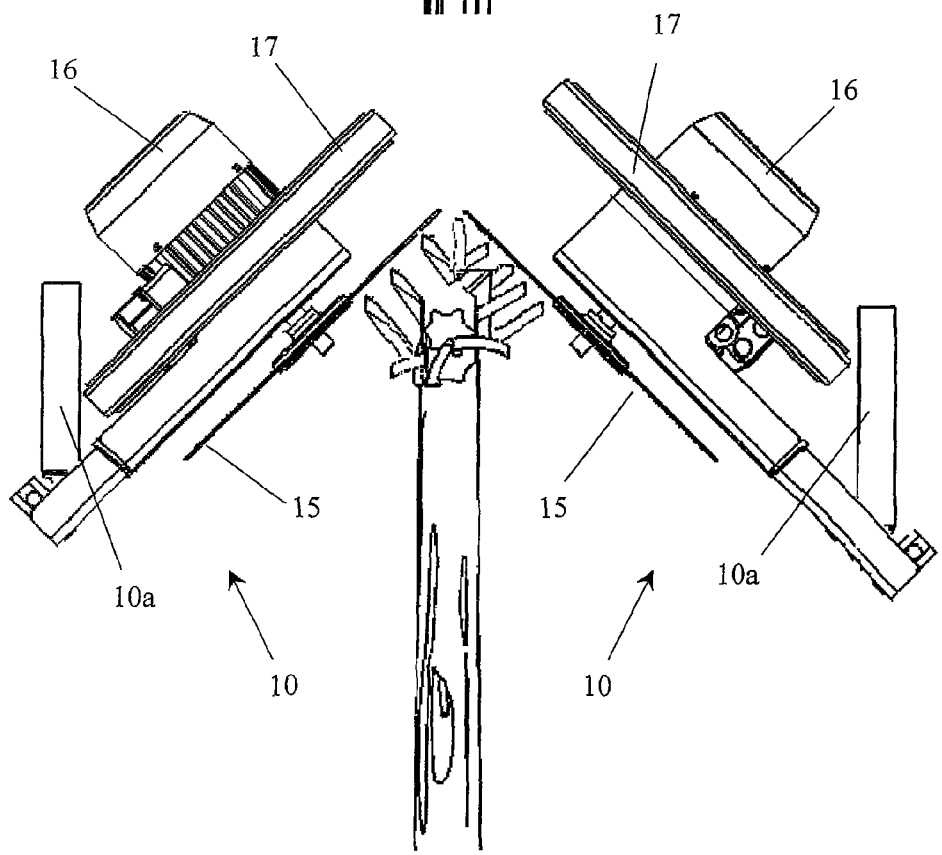

The supports 10a for the upper cutters 10 are mounted on swivel couplings not shown so that the cutters are likely be positioned either horizontally (FIG. 5a), or according to a reverse V conformation under which the cutters form an angle, for example, a 45° angle, in relation to the horizontal (FIG. 5b). This makes it possible to cut the stocks that extend above the horizontal.

The upper cutters are preferably oriented with a clearance angle of a few degrees downward and forward in relation to the travel direction of the machine.

Figure 4:
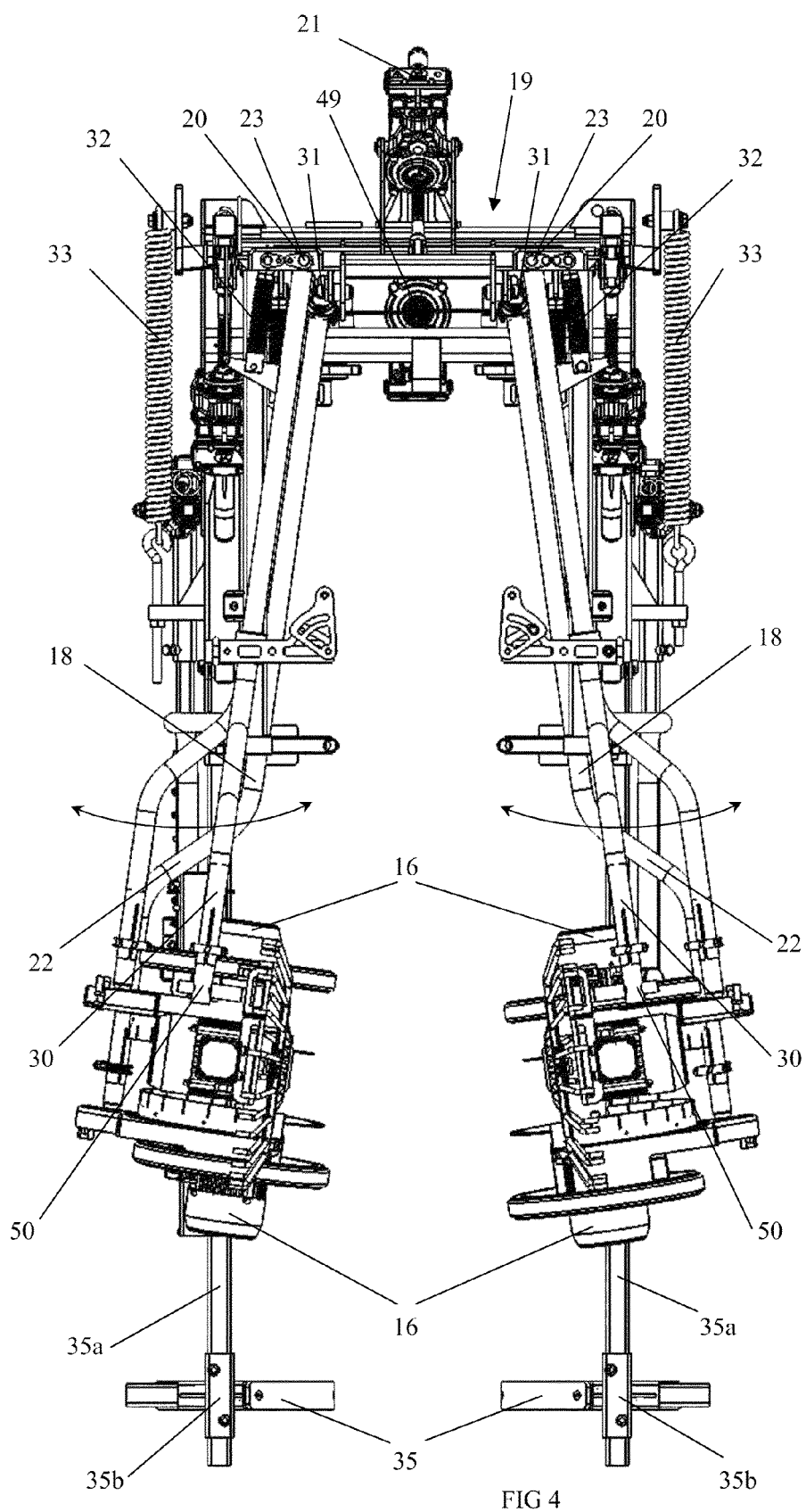
FIG. 4 is a similar elevation view of FIG. 3, showing the cutting assemblies in an apart position.
Figure 13:
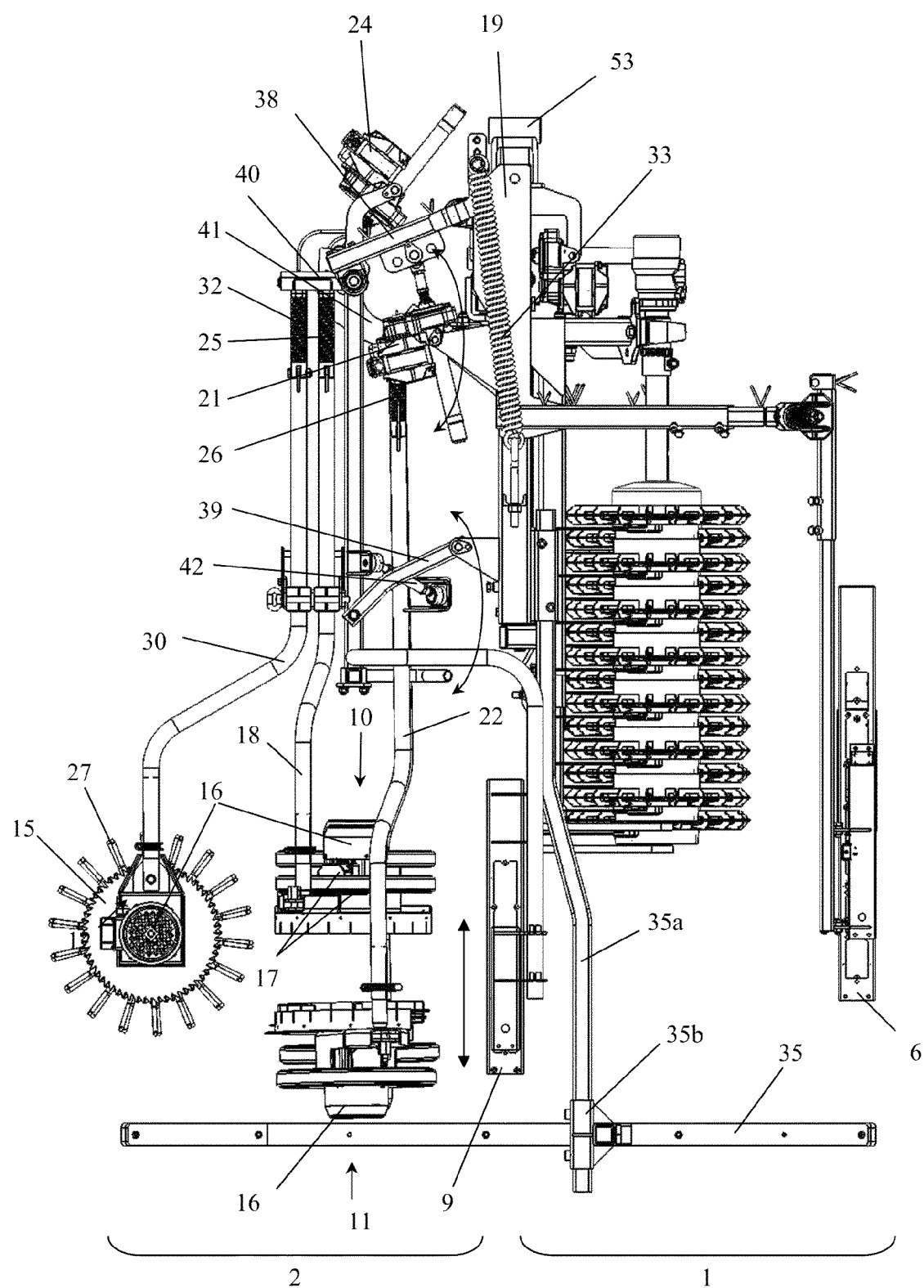
FIGS. 13a and 13b are side elevation views showing more specifically the raise/lower systems for the upper, lower and lateral cutters shown in high and low position respectively.
Figure 13B:
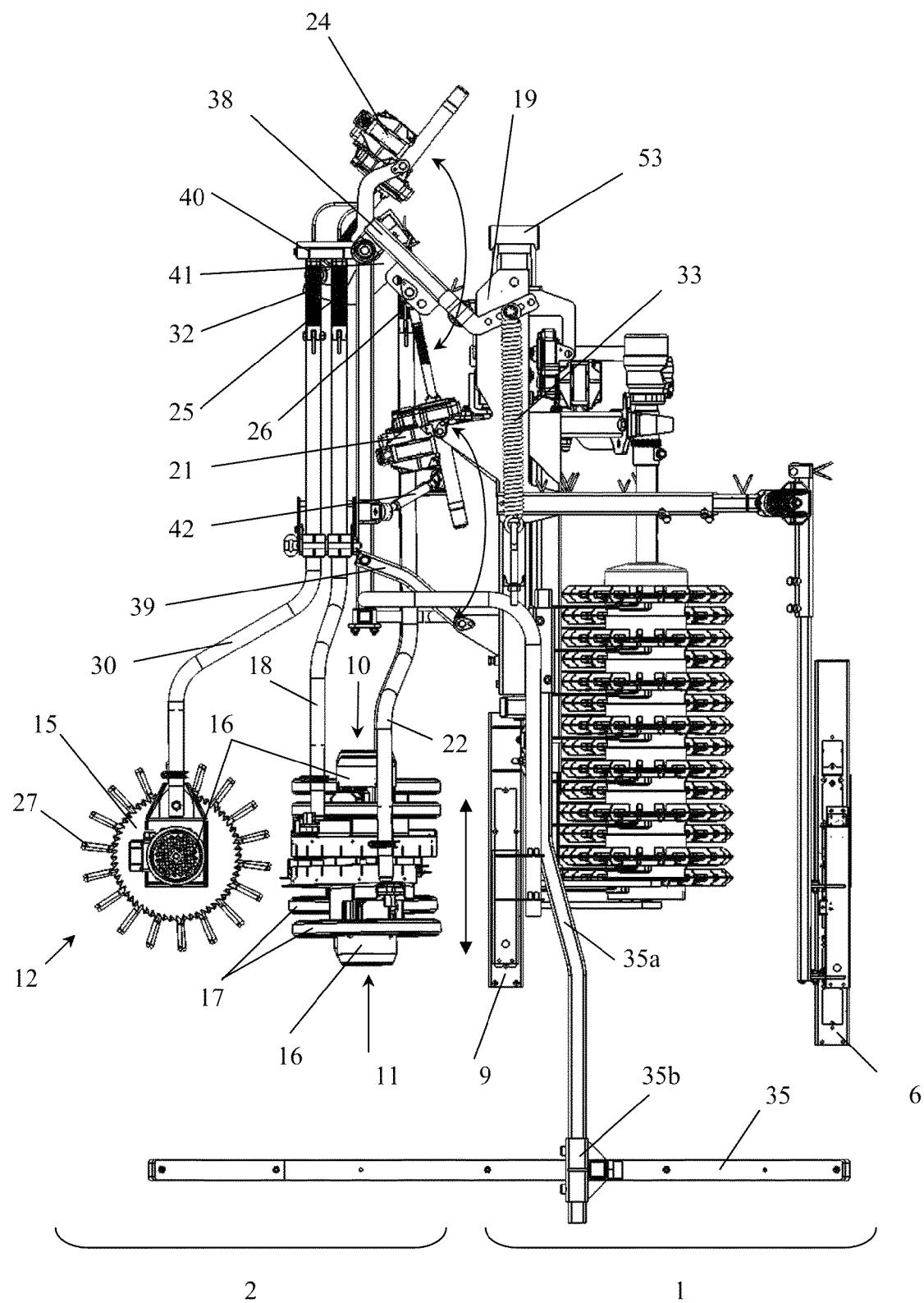
Figure 14:
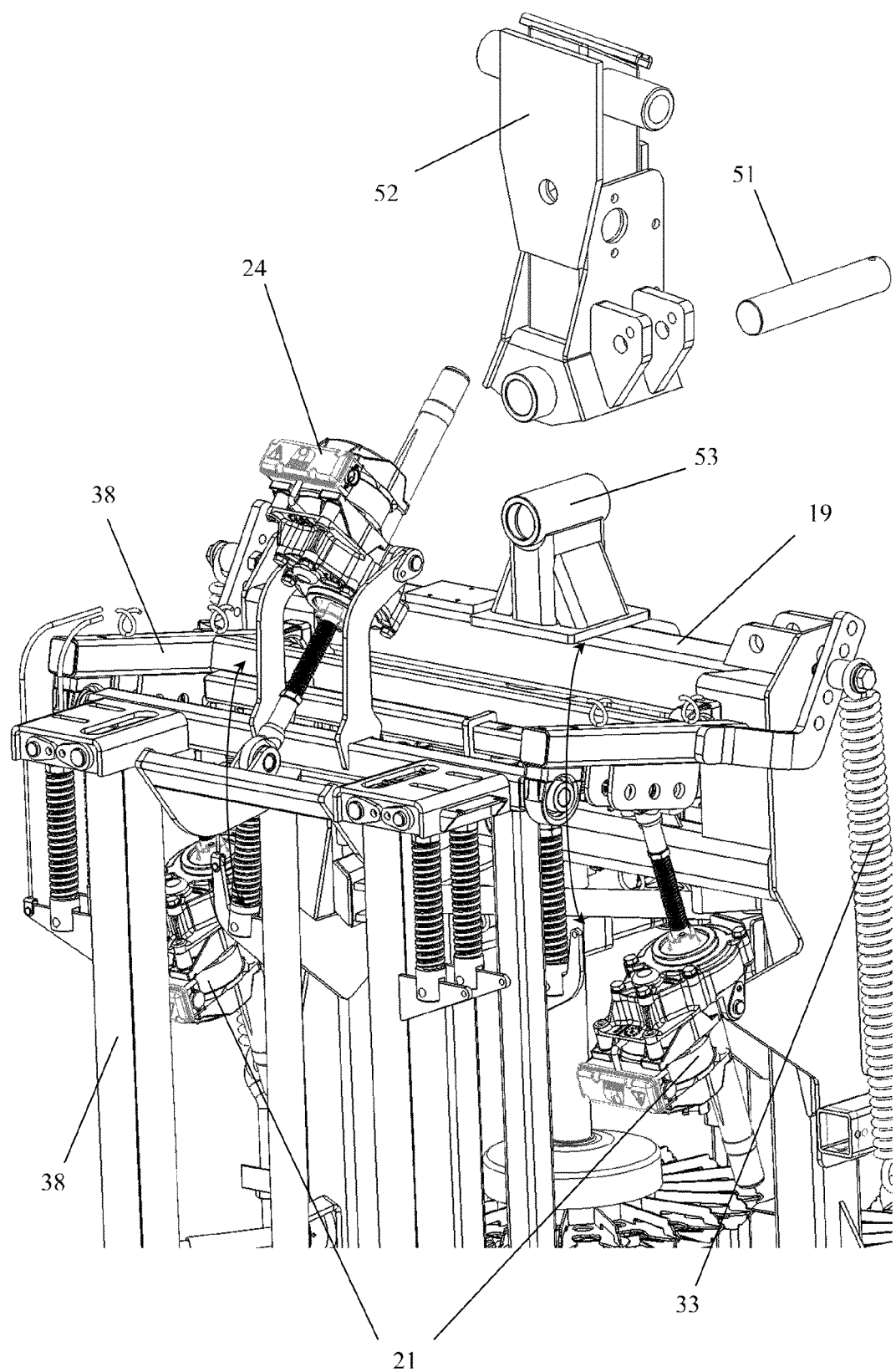
FIG. 14 is a detailed perspective view showing the electric actuators ensuring the operation of the raise/lower systems for the clear-cutting module assembly and the operation of the raise/lower system of the lower cutters.

The upper cutters are supported by suspended arms 18, as shown on FIGS. 13a and 13b. The arms 18 are articulated at the upper part of the machine frame 19 on a shaft 20 (FIG. 4).

Figure 8:
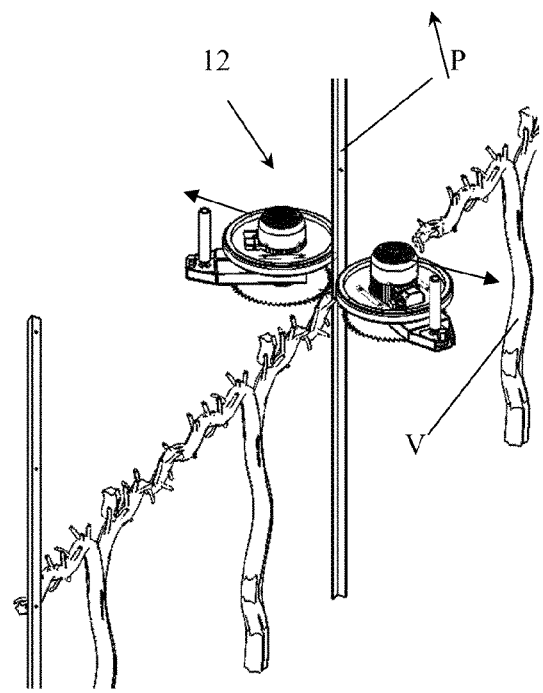
FIG. 8 is a perspective view showing the action of the means allowing for the separation of the upper cutters when going over a post.

FIG. 8 shoes the positioning of the upper cutters when going around a post. When going around a post, the idler or motorized wheels roll on the latter and cause the separation of the upper cutters, thus preventing damage to the post. Automatic return of the upper cutters to their working position is achieved through compression springs 25 connecting the upper part 18 to a fixed element of the upper part of the machine frame 19 (FIGS. 13a and 13b).

The lower cutters 11 (FIGS. 6a, 6b and 7) are made in a manner similar to the upper cutters: each lower cutter comprises a cutting tool 15, for example a circular saw, an electric motor 16 to ensure the rotational drive of said cutting tool and an idler or motorized wheel 17, mounted coaxially to the tool and above it at a distance of a few centimeters, with a radius slightly greater than the radius of action of the cutting tool 15 and making it possible to go around the posts. The wheel 17 has a diameter slightly greater than that of the cutting tool 15 according to the example shown (FIG. 7), a protecting device 15a for the cutting tool 15, such as, for example a soft guard, mounted coaxially to the tool and above it (FIG. 12).

Figures 6A, 6B:
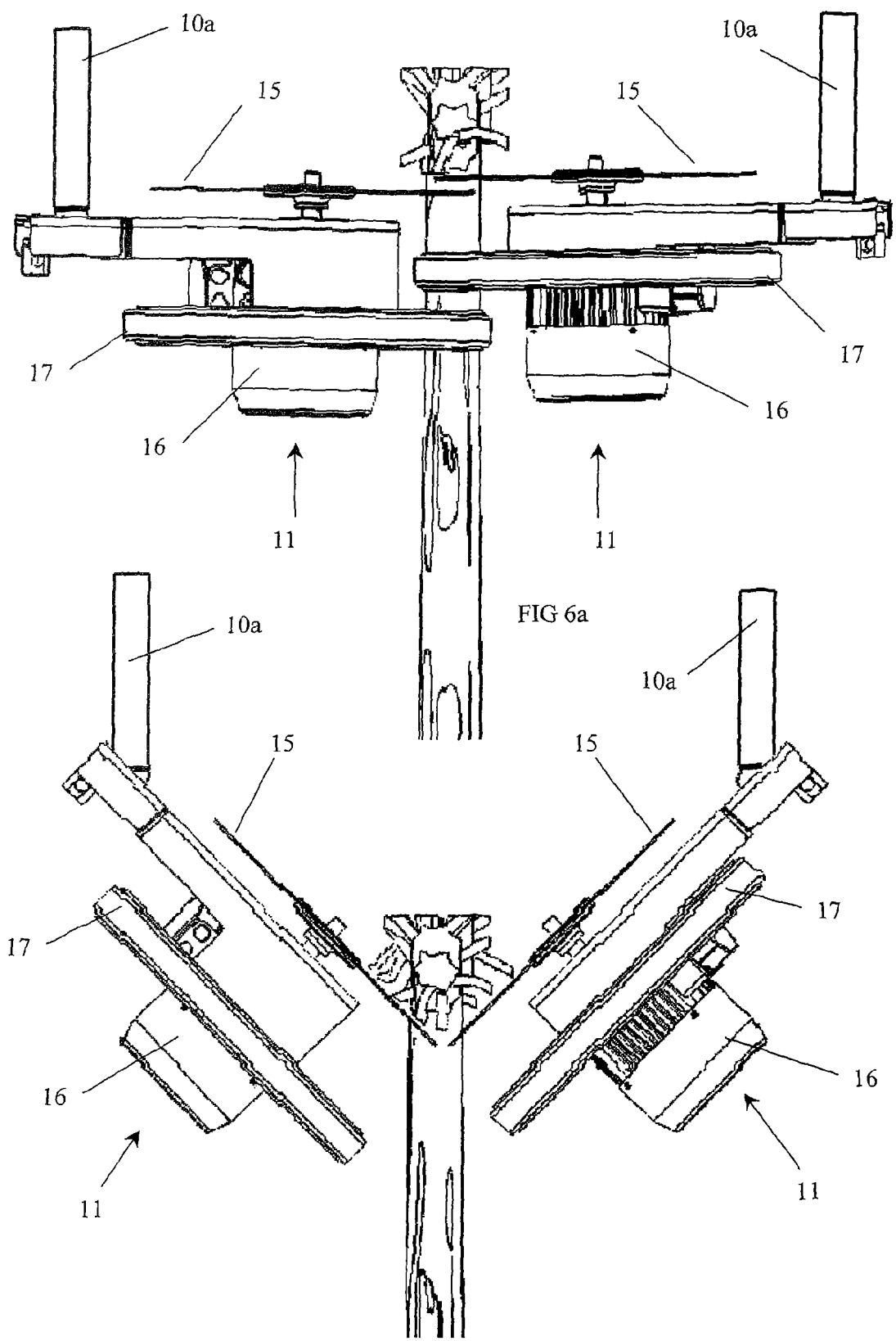
FIGS. 6a and 6b are front elevation views of the lower cutters shown in a pruning situation below a cordon, such cutters being arranged horizontally in FIG. 6a and in V position in FIG. 6b.

Just like for the upper cutters, the supports 10a for the cutting tools of the lower cutters 11 are mounted on swivel couplings not shown so that the cutting tools are likely to be positioned either horizontally (FIG. 6a), or according to a V conformation, for example at a 45° angle in relation to the vertical (FIG. 6b). This makes it possible to cut the stocks that extend below the cordon.

The lower cutters are preferably oriented with a clearance angle of a few degrees upward and forward in relation to the travel direction of the machine.

Figure 9A:
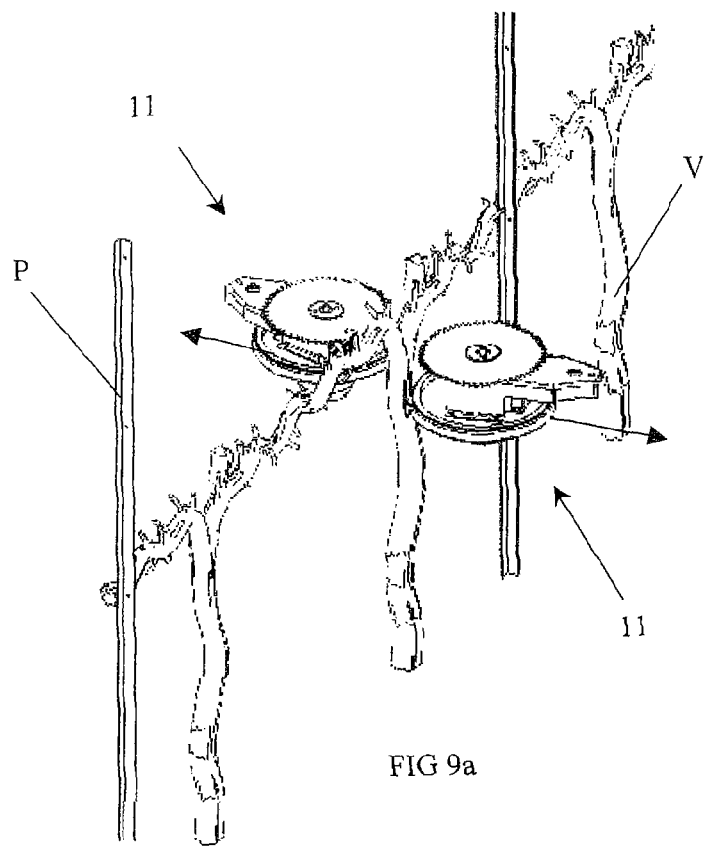
FIGS. 9a and 9b are perspective views showing the action of the means permitting the separation of the lower cutters when going over a stock (FIG. 9a) and when going over a post (FIG. 9b), respectively.
Figure 9B:
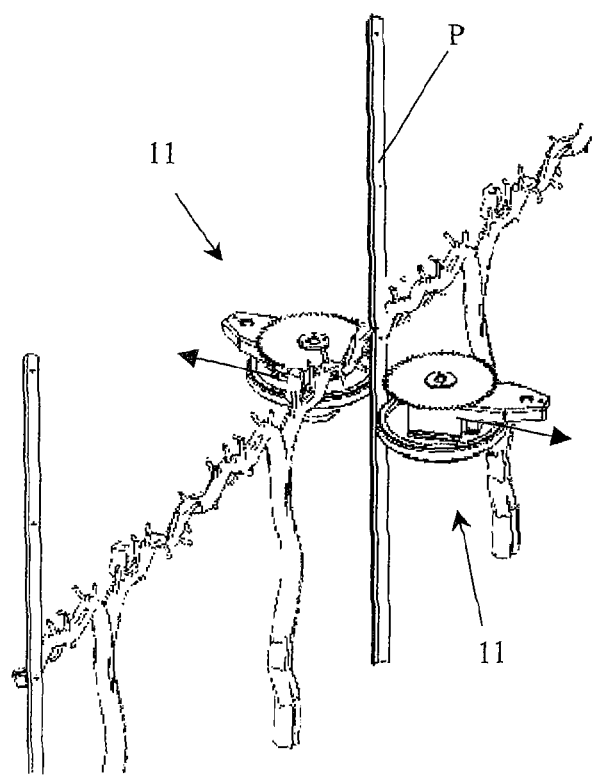

The lower cutters 11 are supported by arms 22 swiveling on a shaft 23, as shown in FIG. 4. FIGS. 9a and 9b show, respectively the rounding of a stock and the rounding of a post by the lower cutters 11. In a stock or post rounding situation, the idler or motorized wheels of said lower cutters roll over said post or said stock and cause the separation of the lower cutters, thus preventing any damage to said post or said stock. Automatic return of the lower cutters to their working position is achieved through compression springs 26 connecting the upper part of the arms 22 to a fixed element of the upper part of the machine frame 19 (FIGS. 13a and 13b).

The upper cutters 10 and/or the lower cutters 11 are mounted with an independent lateral movement capability.

Figure 10:
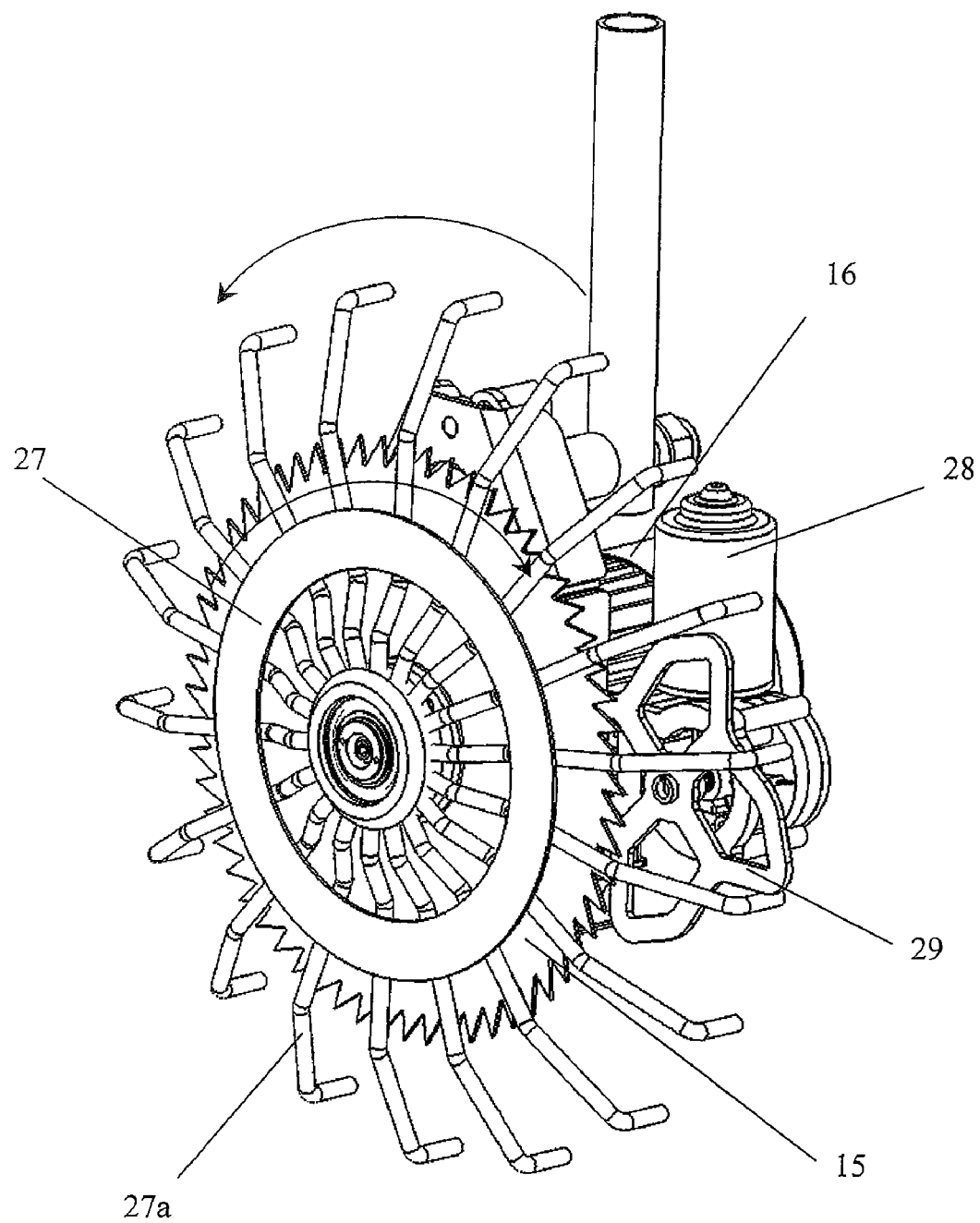
FIG. 10 is a detailed perspective view of a lateral cutter equipped with a rotary comb.

Each lateral upper cutter 12 (FIGS. 10 and 11) comprises:
a cutting tool 15, consisting for example of a circular saw;
an electric motor 16 for the rotational driving of the cutting tool 15;
a rotary comb 27, designed to maintain the associated cutting tool at a determined distance and close to the cordon without damaging the latter, this rotary comb being placed in front of the internal face of the cutting tools or blades 15 and comprising spaced-out radial fingers preferably provided with a curved end 27a, so as to surround the toothed periphery of said cutting tools 15 in order to avoid damaging the stocks; the lateral cutters 12 being guided in their movement on both sides of the cordon by said rotary combs 27; and
an electric motor 28 for the rotational driving of the comb 27, through a pinion 29 (FIG. 10), preferably in the opposite direction of the direction of rotation of the cutting blade 15.

The combs 27 are driven in rotation at a tangential speed equal or close to the machine travel speed when working.

The lateral cutters 12 components are supported by suspended arms 30, as shown in FIGS. 13a and 13b. The arms 30 swivel at the upper part of the machine frame 19 on a haft, preferably on the same shaft as the one on which the arms supporting the upper cutters swivel.

The lateral cutters 12 are mounted with an independent lateral movement capability. Furthermore, they are also mounted with a capability to retract backward and upward in relation to the machine travel direction through pivots 50 (FIG. 3), in case they run into an obstacle. The lateral cutters can be equipped with shoes or other guiding means on both sides of the vine.

Figure 11:
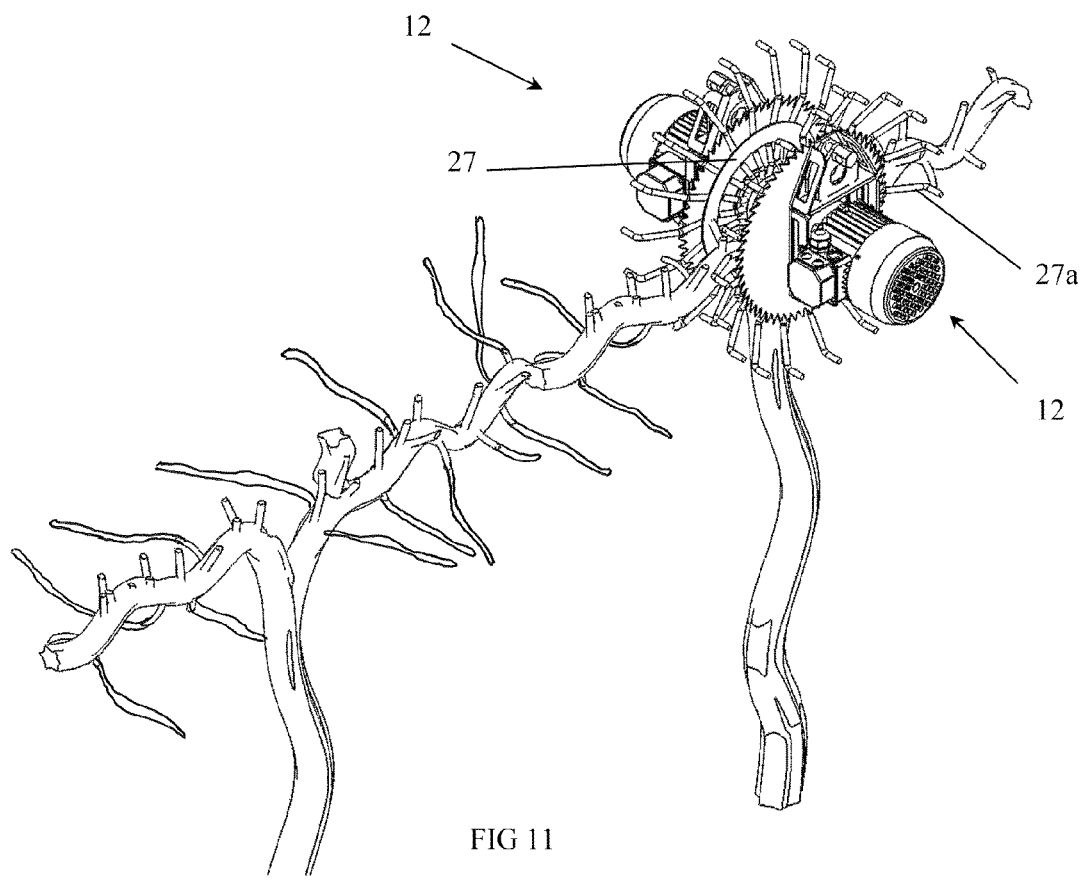
FIG. 11 is a perspective view showing the functioning of the lateral cutters along a cordon.

FIG. 11 shows the positioning of the lateral cutters when working. The maintaining of the lateral cutters in working position closest to the cordon is achieved through compression springs 32 connecting the upper part of the arms 30 to a fixed element of the upper part of the machine frame 19 (FIGS. 13a and 13b).

It is to be noted that it is possible to change the speed of rotation of the circular cutting tools 15 of cutters 10, 11, 12 using electric or hydraulic variable speed drives.

The clear-cutting module also comprises two raise/lower systems for the upper, lower and lateral cutters, as shown in FIGS. 13a and 13b.

The first raise/lower system enables all upper, lower and lateral cutters to move vertically so as to adjust the positioning of said cutters in relation to the top of the cordon, at a distance predetermined by the operator, with a precision of a few millimeters. The second raise/lower system enables the lower cutters to move vertically so as to adjust the positioning of said lower cutters in relation to the bottom of the cordon, at a distance predetermined by the operator, with a precision of a few millimeters.

The first raise/lower system comprises, on one hand, an articulated parallelogram with pivot links, consisting of an upper arm 38, a lower arm 39, a mobile frame 40 on which the arms 18 and 30 swivel and the machine frame 19, and on the other hand, two electric actuators 21 designed to actuate said parallelogram (FIGS. 13a, 13b).

The second raise/lower system comprises, on one hand, an articulated parallelogram with swivel links, consisting of an upper arm 41, a lower arm 42, arm 22 and the frame 40, and on the other hand, an electric actuator 24 designed to actuate said parallelogram (FIGS. 13a, 13b).

The clear-cutting module 2 comprises a raise/lower system enabling the upper cutters 10 above the cordons to follow said cordons with respect to height with a high precision of a few millimeters.

The clear-cutting module 2 comprises a raise/lower system enabling the upper cutters 10 and the lateral cutters 12 to move so as to follow the cordons with a high precision of a few millimeters. The clear-cutting module 2 comprises a second raise/lower system enabling the lower cutters 11 to make, below the cordons, a cut of the stocks at a distance from the cordons with a precision of a few millimeters. This system comprises, for example, parallelogram 22, 40, 41, 42.

The clear-cutting module 2 comprises at least an actuator 49 (FIG. 3), either electric or hydraulic, controlled by the operator and ensuring the separation and return to active close position of the upper cutters 10, and/or of the lower cutters 11, and/or of the lateral cutters 12 for example for entering and exiting the rows of vine worked on.

The raise/lower system of the cutters for the clear-cutting module is controlled by the machine analysis and command electronic system.

The electric or hydraulic actuators 21, 24 of the raise/lower systems are assisted by springs 33 (FIGS. 13a, 13b).

Figure 3:
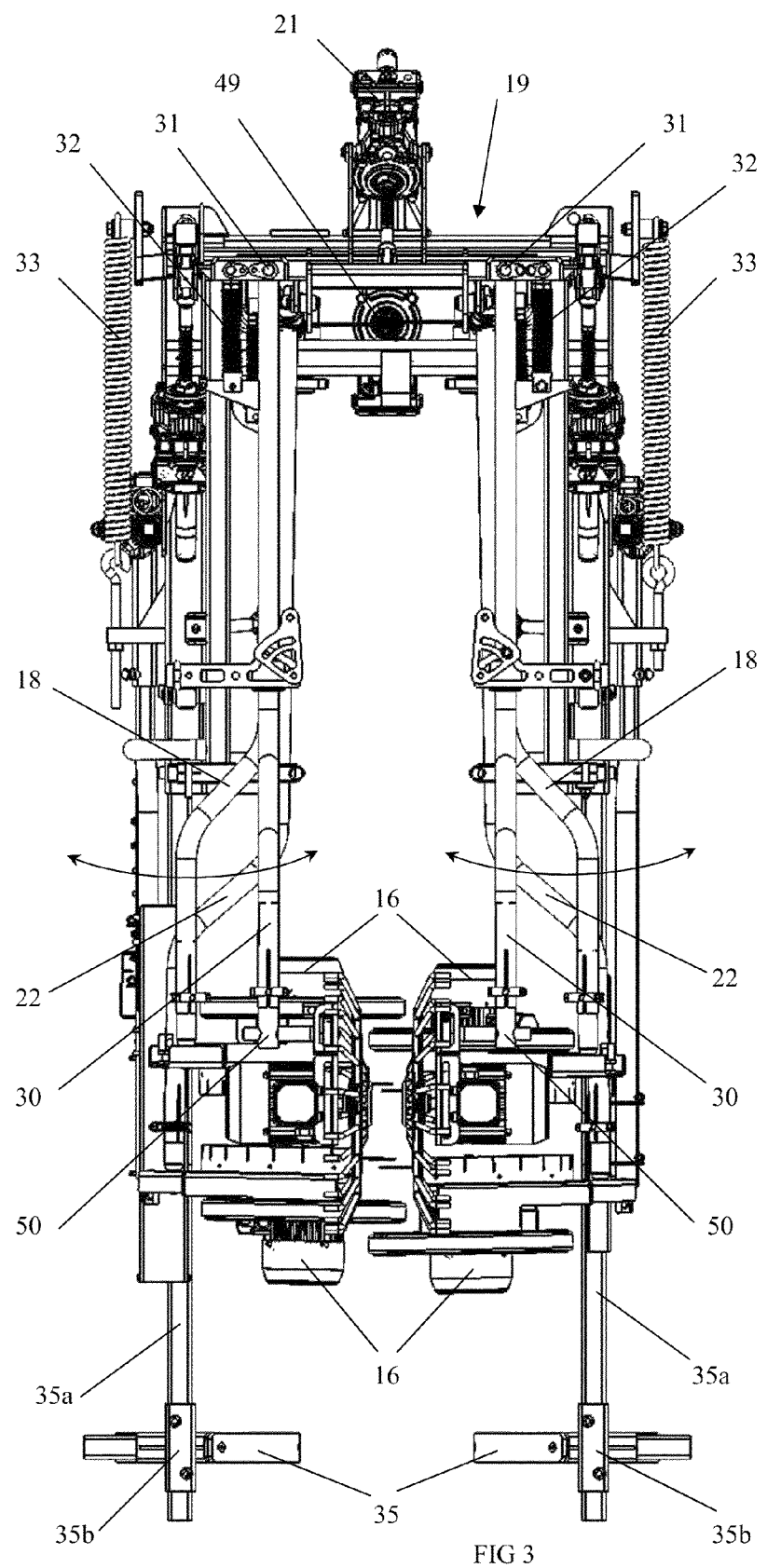
FIG. 3 is a rear elevation view of the machine with the right and left cutting assemblies shown in close position.

The machine also comprises centering means making it possible to position it in relation to the vine stocks and posts. These centering means consist for example of spaced-out shoes 35, arranged horizontally or roughly horizontally on both sides of the vertical median working plane of the machine, below its cutters. Such shoes 35 are for example fixed to the lower part of legs 35a integral with the frame of the machine pre-pruning module, for example using well-known attachment means 35b permitting their adjustment with regard to height and spacing (FIGS. 3 and 13a).

When working, these shoes 35 rest and slide on the stocks or posts so that this arrangement makes it possible to limit the lateral oscillations of the machine caused by the instability of the carrier vehicle due to the unevenness of the ground.

The machine analysis and command electronic system is configured so as to be able to process the information transmitted by the artificial vision systems 6 and 9 of the pre-pruning module 1 and of the clear-cutting module 2, respectively, and to control the positioning of the cutters of the modules, based on the position and conformation of the posts P, vine stocks V and cordons C.

Figure 15A:
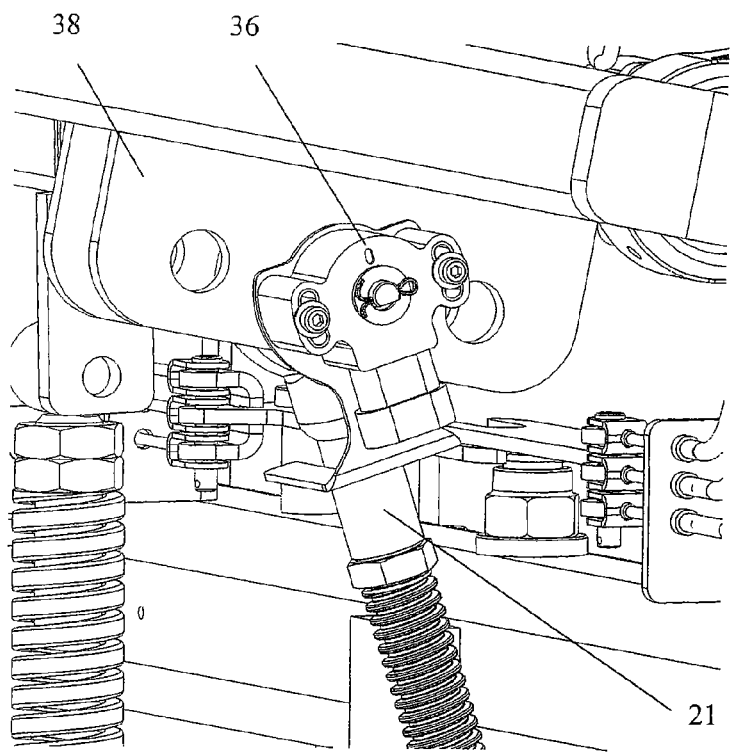
FIGS. 15a and 15b are perspective detailed views showing, respectively, the positioning of the position sensors of the clear-cutting module raise/lower system (FIG. 15a) and of the raise/lower system actuators of the lower cutters (FIG. 15b).
Figure 15B:
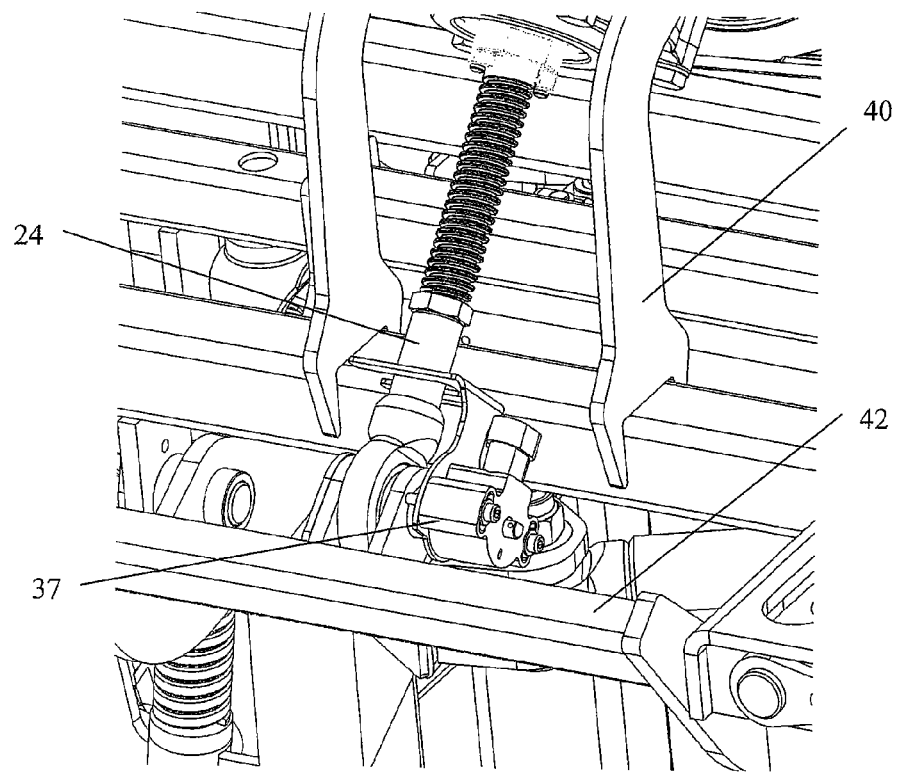

The electronic system is configured in particular:
to analyze and process the information transmitted by the artificial vision system 6 of the pre-pruning module 1, and, on the basis of this information:
measure the travel speed of the machine from the tracking of the position of the stocks to be pre-pruned at given times, to locate the posts of the vine row and to detect the position of the cordon;
after having determined the travel speed of the machine, adjust the rotational driving speed of the cutting assemblies of the pre-pruning module until said assemblies turn at a speed of rotation close to the machine travel speed;
control the positioning of the cutting assemblies of the pre-pruning module and of the pruning module above the cordon at a distance predetermined by the operator by triggering the action of the jack 44 (FIG. 16) that ensures the vertical movements of the cutting assemblies of the pre-pruning module and pruning module; and
trigger the action of the jack that ensures the separation movements when avoiding a post, upon entry or exit of a row and, and the bringing closer of the cutting assemblies of the pre-pruning module when working; and
to analyze and process the information transmitted by the artificial vision system 9 of the clear-cutting module 2, and, on the basis of this information:
control the positioning of the cutters of this module around the cordon with the required precision to achieve a "precision clear cut";
control the positioning of the cutters 10, 11, 12 of the second module 2 based on the parameters for the machine travel speed and predetermination by the operator of the cutting distance in relation to the cordon;
control the action of the electric actuators 21, after detection of the upper contour of the cordon by the second artificial vision system, to adjust the positioning of all upper, lower and lateral cutters in relation to the top of the cordon at a distance pre-programmed by the operator (FIGS. 13a, 13b); the electric actuators 21 being equipped with position sensors 36 (FIG. 15a) that participate in the controls of said actuators; and
control the action of the electric actuator 24, after detection of the lower contour of the cordon by the second artificial vision system to adjust the positioning of all lower cutters in relation to the bottom of the cordon at a distance pre-programmed by the operator (FIGS. 13a, 13b); the electric actuator 24 being equipped with a position sensor 37 (FIG. 15b) that participates in the control of said actuator.

The machine is mounted on a carrier vehicle 43, preferably on the front of the latter. It can, for example, be suspended at the end of a swivel carrier arm 34 that is preferably steerable, itself supported by the chassis of a vehicle that may be pulled or self-propelled and whose mobile part is connected to a jack 44 designed to impart it with upward or downward movements so as to raise or lower said machine, as shown in FIG. 16.

The vehicle onto which the machine is mounted comprises on one hand the general power supply 46 of the automatic control box 47 containing the machine electronic analysis and control system, and on the other hand, a control console 48 enabling the operator to adjust the pre-pruning and pruning parameters, to activate the electric motors 16 of the cutting tools 15 and to command directly all automatic controls.

Figure 16:
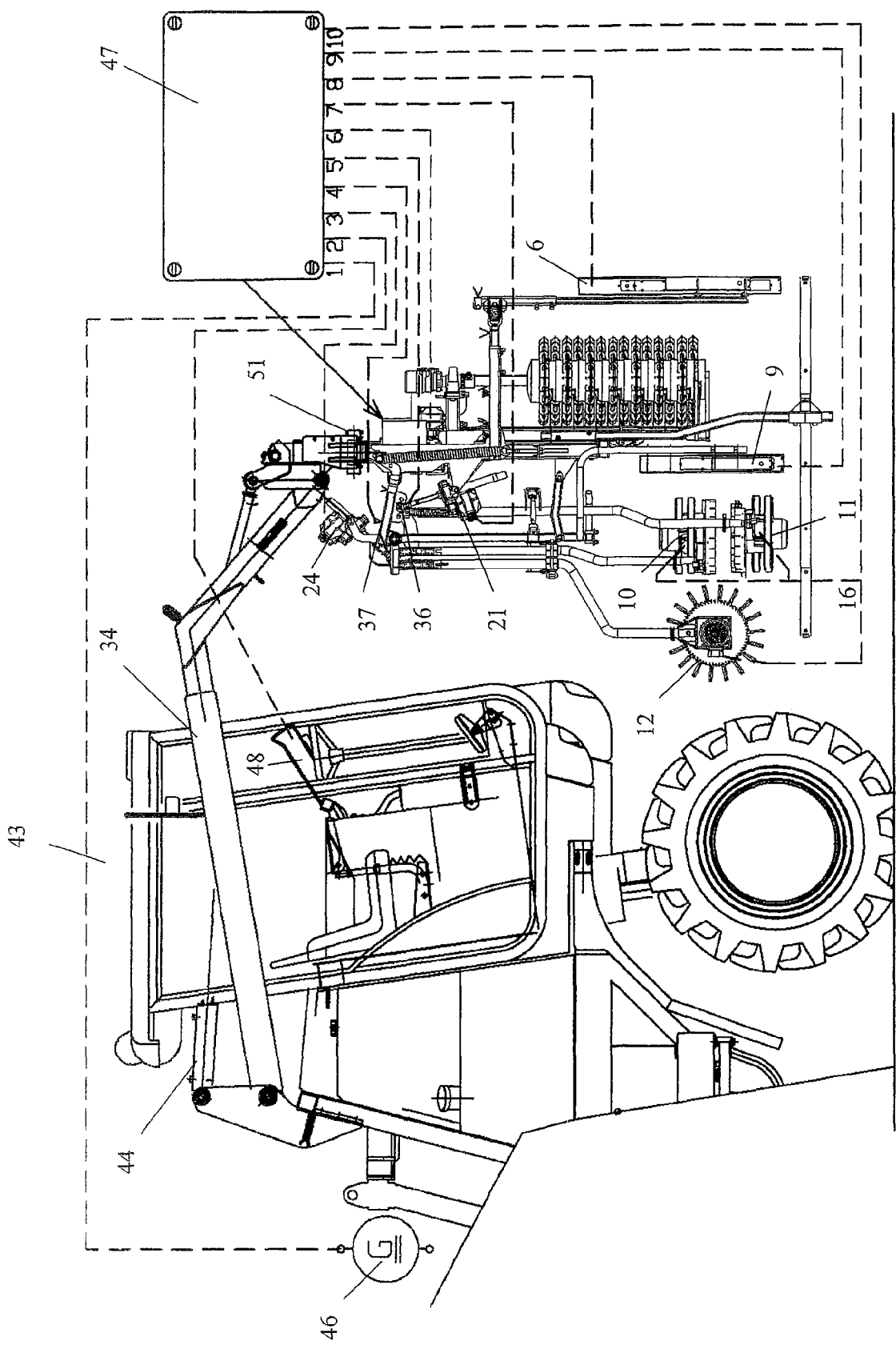
FIG. 16 is a side elevation view showing an embodiment of the machine mounted on a carrier vehicle and showing the electronic system link diagram.

As shown in FIG. 16, the following departs from that box:
a link L1 to the general supply 46;
a link L2 to the control console 48;
a link L3 to the actuator 24 of the raise/lower system of the lower cutters;
a link L4 to the position sensor 37 of the actuator 24;
a link L5 to the actuators 21 of the raise/lower system of the upper, lateral and lower cutters;
a link L6 to the position sensors 36 of the actuators 21;
a link L7 to the artificial vision system 6 of the pre-pruning module;
a link L8 to the artificial vision system 9 of the clear-cutting module;
a link L9 to the electric motors 16 of the cutters 10, 11 and 12; and
a link L10 to the actuator 49 to open and close the cutters when entering or exiting a row.

I claim:

1. An apparatus for automatically pruning vines grown in a row in a cordon-leading manner in which a cordon is attached on a carrier wire or rail, the apparatus comprising:
a chassis suitable for moving along a direction of travel;
a pre-pruning module affixed to said chassis, said pre-pruning module having a pair of cutting assemblies suitable for positioning on opposite sides of the row;
a clear-cutting module affixed to said chassis behind said pre-pruning module relative to the direction of travel, said clear-cutting module having cutters; and
at least one position-sensing means positioned forwardly of said clear-cutting module, the position-sensing means for locating the cordon and positioning said cutters through a transmitter and a receiver so as to achieve a clear cut of prunings from a periphery of the cordon at a predetermined short distance in relation to the cordon.

2. The apparatus of claim 1, said position-sensing means being at least one artificial vision system.

3. The apparatus of claim 1, said position-sensing means for determining a travel speed of said chassis.

4. The apparatus of claim 3, said position-sensing means for positioning said cutters based on the travel speed and a determination of a cutting distance from the cordon.

5. The apparatus of claim 1, said cutters comprising at least a pair of lateral cutters arranged so as to be suitable for being positioned on opposite sides of the cordon, said at least a pair of lateral cutters having a rotary combs suitable for guiding a movement of the lateral cutters.

6. The apparatus of claim 1, said position-sensing means being an electronic analysis system for detecting and following upper contours and lower contours of the cordon.

7. The apparatus of claim 6, said cutters having positioning actuators respectively operatively connected thereto, said position-sensing means for controlling said positioning actuators so as to follow contours of the cordon at a predetermined distance.

8. The apparatus of claim 1, said cutters comprising at least two upper cutters suitable for moving along the cordons, the two upper cutters being arranged horizontally or in a inverted-V configuration.

9. The apparatus of claim 8, the upper cutters being resiliently mounted so as to separate when going over a railing post and so as to return together thereafter.

10. The apparatus of claim 8, said clear-cutting module comprising an actuator operatively connected to the upper cutter so as to selectively open the upper cutters away from each other and to close the upper cutters toward each other.

11. The apparatus of claim 8, the two upper cutters being independently laterally movable.

12. The apparatus of claim 1, said cutters comprising at least two lower cutters suitable for moving below the cordon, the lower cutters arranged horizontally or in a V-shaped configuration.

13. The apparatus of claim 12, the lower cutters being resiliently mounted so as to allow the lower cutters to automatically separate when the lower cutters pass over a railing post.

14. The apparatus of claim 12, said clear-cutting module comprising actuators operatively connected respectively to the lower cutters so as to selectively allow the lower cutters to separate and return.

15. The apparatus of claim 12, the lower cutters being mounted to said chassis so as to be independently laterally movable.

16. The apparatus of claim 12, said clear-cutting module further comprising wheels respectively mounted in relation to the lower cutters, said wheels having a radius greater than a radius of the lower cutters.

17. The apparatus of claim 1, said clear-cutting module comprising at least two lateral cutters suitable for positioning on opposite sides of the cordon.

18. The apparatus of claim 17, the lateral cutters having rotary combs positioned respectively on internal faces thereof.

19. The apparatus of claim 18, the lateral cutters having a cutting edge, said rotary combs having curved fingers arranged around said cutting edge.

20. The apparatus of claim 17, the lateral cutters being independently laterally movable.

21. The apparatus of claim 17, the lateral cutters being resiliently mounted so as to retract backwardly and upwardly in relation to the direction of travel.

22. The apparatus of claim 17, the lateral cutters respectively having guiding shoes thereon.

23. The apparatus of claim 1, said cutters each being a circular cutting tool.

24. The apparatus of claim 1, said cutters each having a motor connected thereto so as to be independently driven.

25. The apparatus of claim 1, said clear-cutting module comprising a raise-and-lower system so as to allow the cutters to closely follow the cordon.

26. The apparatus of claim 25, said cutters comprising a pair of upper cutters, said raise-and-lower system enabling said pair of upper cutters to be positioned above the cordon.

27. The apparatus of claim 25, said cutters comprising a pair of lower cutters, said raise-and-lower system suitable for positioning said pair of lower cutters so as to cut stocks below the cordon.

28. The apparatus of claim 25, the positioning-sensing means being operatively connected to said raise-and-lower system.

29. The apparatus of claim 25, said raise-and-lower system comprising a plurality of actuators respectively connected to said cutters.

30. The apparatus of claim 29, said plurality of actuators being assisted by springs interconnected to said cutters.

31. The apparatus of claim 29, said plurality of actuators having position sensors therein.

32. The apparatus of claim 1, further comprising:
a centering means operatively connected to said clear-cutting module for centering said clear-cutting module in relation to the vines.

33. The apparatus of claim 32, said centering means comprising guiding shoes arranged generally horizontally on opposite sides of a vertical median plane of said chassis.

34. The apparatus of claim 1, further comprising:
a carrier vehicle having a carrier arm, said chassis having a suspension device mounted at an end of said carrier arm.

35. A method for automatically pruning vines grown in a cordon-leading manner in which at least one cordon is attached on a carrier wire or rail either horizontal or generally parallel to the earth, the cordon having stocks extending thereabove, the method comprising:
pre-pruning the stocks extending above the cordon;
removing the pre-pruned stocks using a first cutting module;
positioning a second cutting module in the cordon by using a position sensor, the position sensor transmitting and receiving signals, said second cutting module following said first cutting module; and
clear cutting of remaining prunings from a periphery of the cordon by the second cutting module, the position sensor controlling a position of said second cutting module relative to said first cutting module.

* * * * *